United States Patent [19]
Wang

[11] Patent Number: 4,741,724
[45] Date of Patent: May 3, 1988

[54] CHAIN WHEEL

[76] Inventor: Chen-Tsan Wang, No. 9-8, Jen-Hua Rd., Ta-Li Hsiang, Taichung Hsien, Taiwan

[21] Appl. No.: 941,421

[22] Filed: Dec. 15, 1986

[51] Int. Cl.⁴ .............................................. F16H 55/30
[52] U.S. Cl. ..................................... 474/160; 474/164
[58] Field of Search ............... 474/152, 158, 160, 164; 74/609

[56] References Cited

U.S. PATENT DOCUMENTS

| | | | |
|---|---|---|---|
| 3,477,303 | 11/1969 | Brilando | 474/160 X |
| 4,009,621 | 3/1977 | Segawa | 474/160 |
| 4,642,075 | 2/1987 | Nagashima | 474/164 X |

*Primary Examiner*—Stephen J. Novosad
*Assistant Examiner*—Thuy M. Bui
*Attorney, Agent, or Firm*—Banner, Birch, McKie & Beckett

[57] ABSTRACT

A combined chain wheel and chain guard assembly is constructed from a single piece plate member which is formed, by stamping or the like, into a hub portion, two radially spaced annular members substantially lying in the same plane as the hub portion, an outermost rim member which serve as a chain guard radially spaced from the annular members and offset to the plane of the annular members, and radial strip members interconnecting the annular members and the outermost rim member. The perimeters of the annular members are flanged and toothed, and the toothed flange of the inner one of the annular members is arranged to be in a plane offset to the plane of the hub. The hub portion lies substantially in a plane of symmetry of the construction.

2 Claims, 2 Drawing Sheets

CHAIN WHEEL

BACKGROUND OF THE INVENTION

This invention relates to a chain wheel assembly that permits one to pedal at different speeds or at a selected speed, and particularly to an improved chain wheel assembly made of a single plate member formed with two toothed rim portions of different diameters lying in different planes, and an outermost rim to serve as a chain guard.

Earlier constructions of the chain wheel assemblies of the type described generally include at least two separate sprockets of different diameters bolted or otherwise secured together in a side-by-side relation. The construction of such chain wheel assemblies requires costly procedure and is expensive. To alleviate the problems inherent in the above-described construction, a simplified construction was proposed in U.S. Pat. No. 4,044,621, wherein a sprocket structure is formed by stamping a single piece plate member, the central portion thereof is dished and toothed at its periphery and offset to a plane parallel to that occupied by an outer annular portion which embodies a set of sprocket teeth on its outer periphery. The offset plate portions are rigidly fixed in their respective positions by bent or stepped strip-like connectors which extend from the outer periphery of the dished portion to the inner periphery of the annular portion. French Pat. No. 2 281 869 discloses another sprocket construction which also includes a single piece plate member formed to have radially spaced annular portions with sprocket teeth at their peripheries, the annular portions lying in different parallel planes and connected by bent or stepped radial strip members. In both constructions descirbed above, since the toothed annular portions are held in their positions by stepped or bent strip members, the constructions are susceptible to deformation when subjected to force, causing misalignment of parts. In addition, the hub portion of the sprocket adapted to be mounted on the pedal crank shaft generally lies out of a plane of symmetry, i.e. in a plane at one side of the parallel planes of the toothed annular portions so that the force applied on the sprocket wheel can not be uniformly distributed, this resulting in a rapid damage of the portions at which the force is localized.

SUMMARY OF THE INVENTION

An object of the present invention is to provide an improved chain wheel assembly of simplified and durable construction in which annular members bearing sprocket teeth substantially lie in the same plane as the hub and the radial strip members of the chain wheel, and the peripheral edges of the annular members being provided with toothed flanges lying in the planes offset to the planes of the respective annular members.

Another object of the invention is to provide a chain wheel assembly of one piece construction incorporating a peripheral portion serving as a chain guard.

According to the present invention, a chain wheel assembly which comprises, a single plate member including a hub portion with strip members extending radially outward, each of the strip members having a flat portion coplanar with the hub portion and a stepped portion extending radially outward and axially outward relative to the plane of the hub portion; a first toothed rim portion around the hub including first arc-shaped toothed members centered at the axis of the hub portion and oriented annularly between the flat portions of the strip members, each of the first arc-shaped toothed members having an arc-shaped first base portion coplanar with the hub portion, an arc-shaped first flange extending axially inward from the perimeter of the base portion and an arc-shaped first toothed flange with teeth extending radially outward; a second toothed rim member, with a greater radius than that of the first toothed rim member, disposed around the first toothed rim member, and including second arc-shaped toothed members centered at the axis and oriented annularly between the flat portions of the strip members, each of the second arc-shaped toothed members having an arc-shaped second base portion coplanar with the hub portion, and an arc-shaped second toothed flange with teeth extending radially outward; and an outermost rim member connected to the stepped portions of the strip members and offset axially to the planes of the hub portion and the first and second toothed flanges of the arc-shaped first and second toothed members. Preferably, the strip members are provided with flanged edge for reinforcement.

The width of each of the strip members between adjacent first arc-shaped toothed members are arranged to be greater than the pitch of the teeth of the first arc-shaped toothed member, wherein each strip member includes a circular protruberance provided thereon between the adjacent first arc-shaped toothed members, and extending axially inward to be flush with the first toothed flange of the first arc-shaped toothed member. The width of each of the strip members between the second arc-shaped toothed members is substantially equal to the pitch of the teeth of the second arc-shaped toothed members.

The present exemplary preferred embodiment will be described in detail with reference to the following drawings, in which:

DETAILED DESCRIPTION OF THE PREFERRED EMBODIMENT

Figure 1:
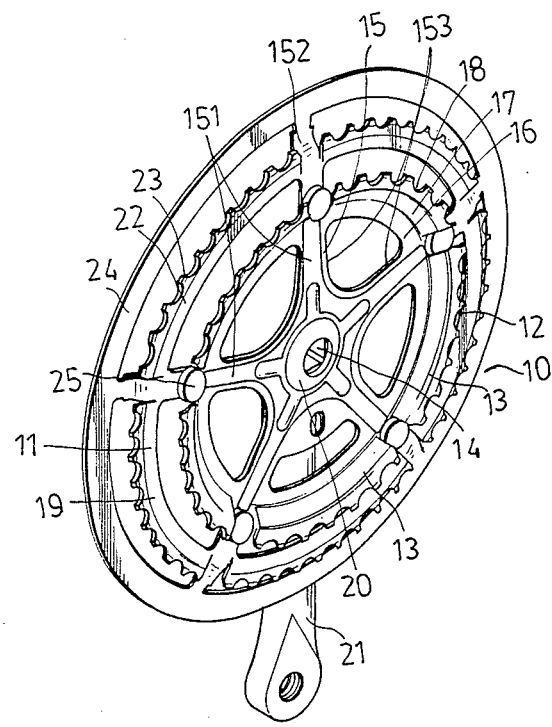
FIG. 1 is a perspective view of a chain wheel assembly according to the present invention.
Figure 2:
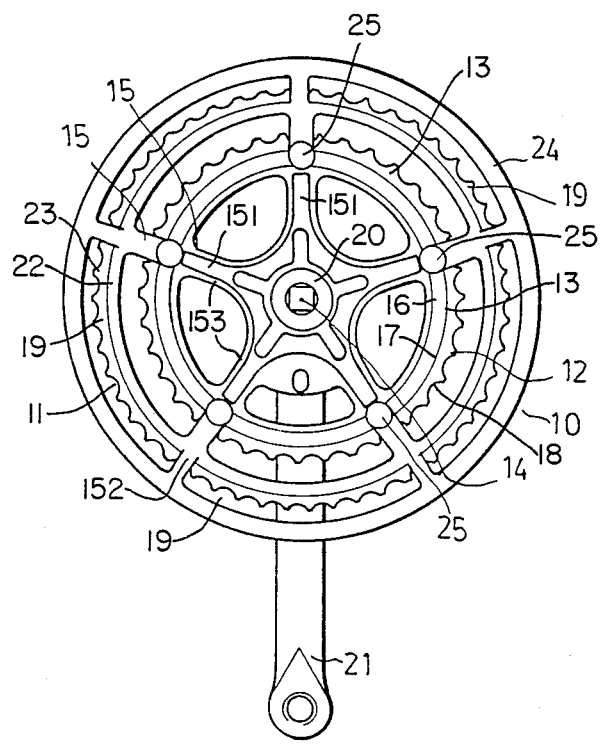
FIG. 2 is a front elevation view of the chain wheel assembly of FIG. 1.
Figure 3:
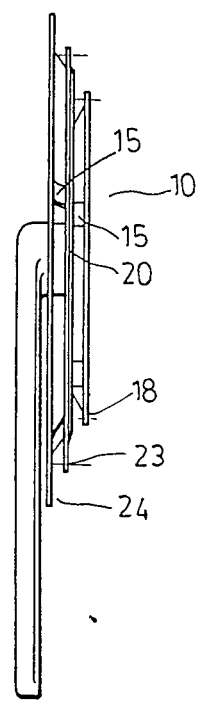
FIG. 3 is a side elevation view of the chain wheel assembly of FIG. 1.

Referring to the drawings, a preferred embodiment of a chain wheel 10 is shown, having a hub 20 with a central hole 14 adapted to be mounted on a crank shaft of a pedal crank 21 of a bicycle. Extending radially outward from the hub 20 are five strip members 15 coplanar with the hub 20. There is a first toothed rim member 12 which is constituted of five arc-shaped toothed members 13 centered at the axis of the hub 20 and disposed annularly between the strip members 15. Each arc-shaped toothed member 13 has an arc-shaped flat base member 16 coplanar with and connected to two strip members 15 at the two ends thereof, an arc-shaped flange 17 extending axially inward from the perimeter of the arc-shaped flat base member 16 relative to the plane of the strip members 15, and an arc-shaped toothed flange 18 extending radially outward from the edge of the arc-shaped flange 17.

There is another toothed rim member 11 which has a greater diameter than the toothed rim member 12 and is constituted of five arc-shaped toothed member 19 centered at the axis of the hub 20, and disposed annularly between adjacent strip members 15. Each arc-shaped toothed member 19 has an arc-shaped flat member 22 and an arc-shaped toothed flange 23 extending radially outward from the circumferential edge of the arc-shaped member 22.

The portions, designated by 151, of the strip members 15 that extends from the hub 20 between adjacent arc-shaped toothed members 13 and between adjacent arc-shaped toothed members 19 are substantially flat, straight and coplanar with the plane of the hub portion 20. Flanges 153 are provided at the edges of the strip members 15 for reinforcement. The outer end portions 152 of the strip members 15 are stepped to extend axially outward to an extent and then radially outward to be connected to an outermost rim 24 which is offset to the planes of the strip members 15, the toothed flanges 18 and 23, and the hub 20. The outermost rim 24 serves as a chain guard for the chain wheel assembly 10.

The width of the strip members 15 is reduced slightly from the hub portion 20 to the outermost rim 24. Since the width of the strip members 15 between adjacent arc-shaped toothed members 13 is greater than the pitch of the teeth of the arc-shaped toothed members 13, circular protruberances 25 are provided on the strip members 15 between adjacent first arc-shaped toothed member 13 which project axially inward to be flush with the arc-shaped toothed flanges 18. A chain (not shown) which engages with and passes over the toothed flanges 18 can pass over the protruberances 25 to move smoothly from one of the arc-shaped toothed flanges 18 to the other. The width of the strip members 15 between arc-shaped toothed members 19 is arranged to be substantially equal to the pitch of the teeth of the arc-shaped toothed members 19 so as to permit a chain to engage with the teeth properly.

It can be appreciated that the construction of the chain wheel assembly as described is more durable than those in the prior art, because the teeth bearing annuar members are substantially in the same plane as the hub 20, and strip members 15, and the hub portion 20 is substantially in the plane of symmetry of the construction.

With the invention thus explained, it is apparent that various modifications and variations can be made without departing from the scope of the invention. It is therefore intended that the invention be limited as indicated in the appended claims.

I claim:
1. A chain wheel comprising:
 a single plate member including a hub portion with strip members extending radially outward, each of said strip members having a flat portion coplanar with said hub portion and a stepped portion extending radially outward and axially outward relative to the plane of said hub portion;
 a first toothed rim portion around said hub including first arc-shaped toothed members centered at the axis of said hub portion and oriented annularly between said flat portions of said strip members, each of said first arc-shaped toothed members having an arc-shaped first base portion coplanar with said hub portion, an arc-shaped first flange extending axially inward from the perimeter of said base portion and an arc-shaped first toothed flange with teeth extending radially outward;
 a second toothed rim member, with a greater radius than that of said first toothed rim member, disposed around said first toothed rim member, and including second arc-shaped toothed members centered at said axis and oriented annularly between said flat portions of said strip members, each of said second arc-shaped toothed members having an arc-shaped second base portion coplanar with said hub portion, and a arc-shaped second toothed flange with teeth extending radially outward; and
 an outermost rim member connected to said stepped portion of said strip members and offset axially from the planes of said hub portion and said first toothed flanges of said arc-shaped first toothed members;
 the width of each of said strip members between adjacent said first arc-shaped toothed members being greater than the pitch of said teeth of said first arc-shaped toothed member, and said strip member further including a circular protruberance provided thereon between adjacent said first arc-shaped tooth members, said protruberance extending axially inward to be flush with said first toothed flange of said first arc-shaped tooth member.

2. A chain wheel as claimed in claim 1, wherein the width of each of said strip members between said second arc-shaped toothed members is substantially equal to the pitch of said teeth of said second arc-shaped toothed members.

* * * * *